United States Patent Office 2,837,507
Patented June 3, 1958

2,837,507

CUPRIFEROUS AZO-DYESTUFFS

Henri Riat, Arlesheim, Switzerland, assignor to Ciba Limited, Basel, Switzerland, a Swiss firm No Drawing. Application March 7, 1955
Serial No. 492,744

Claims priority, application Switzerland March 16, 1954

9 Claims. (Cl. 260—146)

This invention is based on the observation that valuable new cupriferous azo-dyestuffs can be made by treating a dyestuff corresponding to one of the formulae (1)
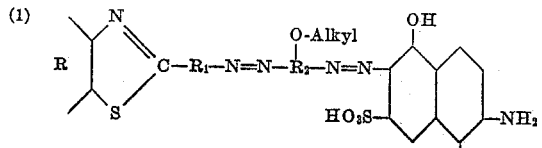

and (2)
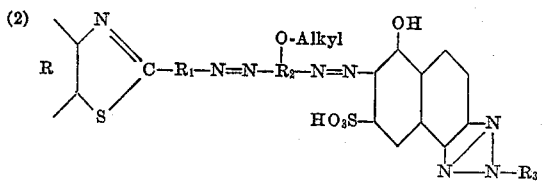

in which R represents a benzene radical fused in the manner shown to the thiazole ring, $R_1$ represents a benzene radical bound to the azo linkage in para-position to the thiazole ring, $R_2$ represents a benzene or napthalene radical, and $R_3$ also represents a benzene or naphthalene radical, and in which at least one of the radicals R and $R_1$ contains a sulfonic acid group and the groups $—R_1—N=N—$, $—O$-alkyl and $—N=N—$ are present in the 1:3:4-positions of the radical $R_2$, with an agent yielding copper under conditions such that an ortho:ortho'-dihydroxy-azo-copper complex is formed with the splitting off of the alkoxy group in the ortho-hydroxy-ortho'-alkoxy-grouping and that the free amino group in the ortho-amino-azo-dyestuff and the azo linkage bound to $R_3$ undergo ring closure to form the triazole ring.

The dyestuffs of the Formula 1 can be made by coupling a diazo-compound of an amine of the formula (3)
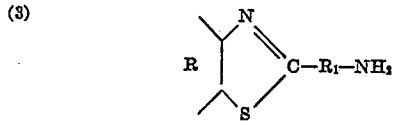

with a middle component of the formula (4)

diazotizing the resulting amino-monoazo-dyestuff of the constitution (5)
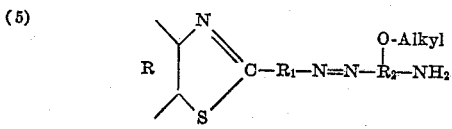

and coupling the resulting diazo-compound with a monoazo-dyestuff of the formula (6)
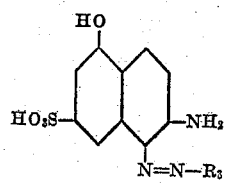

In the above formulae $R_1$, $R_2$ and $R_3$ have the meanings given above in connection with Formula 1.

As initial components there may be used amines of the Formula 3 of which both benzene radicals R and $R_1$ contain further substituents, for example, halogen atoms such as chlorine, or methoxy or ethoxy groups, but especially methyl groups and/or sulfonic acid groups. Owing to their ready availability and the good results obtained therewith there are especially suitable as initial components monosulfonic acids and disulfonic acids of 2-(4'-aminophenyl)-6-methyl-benzthiazole (dehydrothiotoluidine). These compounds correspond to the formula (7)
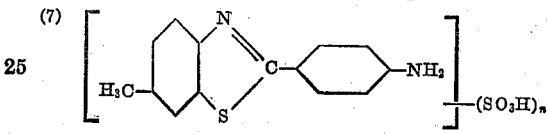

in which $n$ represents a whole number not greater than 2.

As examples of initial components there may be mentioned: The 2-(4'-aminophenyl)-6-methyl-benzthiazole-x-sulfonic acid obtainable by sulfonating 2-(4'-aminophenyl)-6-methyl-benzthiazole with concentrated sulfuric acid; 2-(4'-aminophenyl)-6-methyl-benzthiazole-3'-sulfonic acid which is obtained by the thermal rearrangement of the acid sulfate of 2-(4'-aminophenyl)-6-methyl-benzthiazole; 2-(4'-aminophenyl)-6-methyl-benzthiazole disulfonic acids, for example, the acid obtained by thermal rearrangement of the acid sulfate of the 2-(4'-aminophenyl)-6-methyl-benzthiazole monosulfonic acid obtainable by sulfonating 2-(4'-aminophenyl)-6-methyl-benzthiazole with concentrated sulfuric acid; and the 2-(4'-aminophenyl)-benzthiazole-x-sulfonic acid obtainable by the sulfonation of 2-(4'-aminophenyl)-benzthiazole.

The middle components of the Formula 4 may be of the naphthalene series or advantageously of the benzene series. They contain an alkoxy group, advantageously a methoxy group, which is in ortho-position relatively to the $—NH_2$-group. As examples of suitable middle components there may be mentioned the following compounds:

1-amino-2-methoxy-5-methylbenzene
1-amino-2:5-dimethoxybenzene
1-amino-2:5-diethoxybenzene
1-amino-2-methoxynaphthalene
1-amino-2-methoxynaphthalene-6- or -7-sulfonic acid
1-amino-2-ethoxynaphthalene
1-amino-2-ethoxynaphthalene-6- or -7-sulfonic acid Especially valuable dyestuffs are obtained with 1-amino-2-methoxybenzene itself.

The monoazo-dyestuff of the Formula 6 can be obtained by coupling 2-amino-5-hydroxynaphthalene-7-sulfonic acid under acid conditions with a diazo compound of the naphthalene or more especially the benzene series, which advantageously contains a group imparting solubility in water, such as a sulfonic acid amide group, a carboxyl group or especially a sulfonic acid group. The diazo compounds of the following amines may be mentioned as examples: Aminobenzene, 1-amino-2-methoxybenzene, 1-aminobenzene-2- or -4-carboxylic acid, 1-aminobenzene-3- or -4-sulfonic acid, 1-amino-4-methylbenzene-3-sulfonic acid, 1-amino-benzene-3- or -4-sulfonic acid amide, 2-amino-naphthalene-6-sulfonic acid and 2-aminonaphthalene-4:8-disulfonic acid.

In the manufacture of the dyestuffs of the Formula 1 the coupling of the diazotized initial component with the middle component is generally carried out with advantage in a weakly acid to weakly alkaline medium, for example, an acetic acid medium or a medium rendered alkaline with an alkali bicarbonate. If the middle component has a low capacity for coupling, it is generally of advantage to couple it in the form of its ω-methanesulfonic acid, and subsequently to split off the ω-methane sulfonic acid group. This applies, for example, to 1-amino-2-methoxybenzene. The diazotization of the amino-monoazo-dyestuffs of the Formula 5 can be carried out by methods in themselves known, for example, with the use of hydrochloric acid and sodium nitrite. The diazo-monoazo-compounds so obtained are then coupled in an alkaline medium, for example, a medium rendered alkaline with an alkali carbonate, with the monoazo-dyestuffs of the Formula 6, if desired, with the addition of an agent assisting coupling, such as pyridine or picoline.

The treatment with the agent yielding copper may be carried out by the usual methods. In some cases the coppering treatment may be carried out with a salt of divalent copper in a weakly acid aqueous medium. Alternatively, the dyestuffs may be metallized by the known method in which the metallization is carried out with the use of a copper-tetrammine complex in the presence or absence of an excess of an amine or ammonia for several hours in the vicinity of 100° C. in an aqueous medium. In some cases it is of special advantage to use the process of U. S. Patent No. 2,536,957 in which the coppering is carried out in the presence of an oxyalkylamine, especially ethanolamine, or a copper complex derived from such amine. It is desirable to use an excess of the agent yielding copper, since a part of this agent is necessary as an oxidizing agent for the triazole ring formation which takes place simultaneously with the production of the copper complex.

The new cupriferous dyestuffs of this invention correspond to the general formula (8)

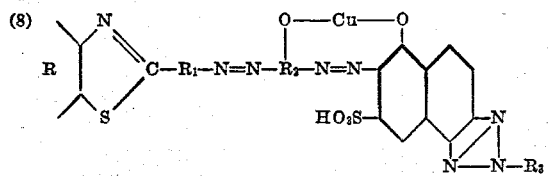

in which R represents a benzene radical fused to the thiazole ring in the manner indicated, $R_1$ represents a benzene radical bound to the azo linkage in para-position to the thiazole ring, $R_2$ represents a benzene or naphthalene radical, and $R_3$ also represents a benzene or naphthalene radical, and in which at least one of the radicals R and $R_1$ contains a sulfonic acid group and the groups —$R_1$—N=N—, —O—Cu— and —N=N— are present in the 1:3:4-positions of the radical $R_2$.

With regard to the above Formula 8 of the cupriferous dyestuffs, this formula undoubtedly represents the correct stoichiometric proportion of copper and the correct position of the copper atom in the complex, but the distribution of the main and secondary valencies in the complex union of the copper has not yet been established with certainty.

The new cupriferous dyestuffs corresponding to the general Formula 8 and obtainable by the process described above can also be made by using, instead of a dyestuff of the Formula 1 which contains a free amino group, a dyestuff of the Formula 2 which already contains the triazole ring. In order to prepare the latter dyestuffs, dyestuffs of the Formula 1 may be treated with oxidizing agents which do not lead to the formation of copper complexes, or an amino-monoazo-dyestuff of the Formula 5 may be diazotized and coupled with a triazole compound of the formula (9)

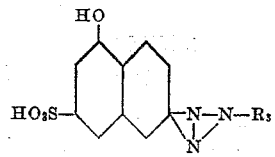

in an alkaline medium. The compounds of the Formula 9 can be made by reacting a monoazo-dyestuff of the Formula 6 with an oxidizing agent such as chromic oxide, sodium hypochlorite and more especially cupric sulfate. The coppering of the disazo-dyestuff so obtained and containing a triazole ring may be carried out in the same manner as the coppering of the trisazo-dyestuffs of the Formula 1, and the same new products of the Formula 8 are obtained.

The cupriferous dyestuffs of the invention can be used for dyeing or printing a very wide variety of materials such as wool, silk, leather, but especially cellulose-containing fibers such as cotton, linen and also artificial silk or staple fibers of regenerated cellulose. The dyestuffs possess a good levelling capacity. The dyeings produced therewith are distinguished by their especially interesting tints and in general by unexpectedly good properties of fastness.

The following examples illustrate the invention, the parts and percentages being by weight:

*Example 1*

32 parts of 2-(4'-aminophenyl)-6-methyl-benzthiazone-x-sulfonic acid (obtainable by sulfonating 2-(4'-aminophenyl)-6-methyl-benthiazole with sulfuric acid containing sulfur trioxide) are dissolved in 200 parts of water with the addition of 5.3 parts of anhydrous sodium carbonate and 6.9 parts of sodium nitrite are added. The solution is slowly run into a mixture of 30 parts of hydrochloric acid of 30 percent strength, 100 parts of water and 100 parts of ice. The whole is stirred for one hour, and then the suspension of the diazo compound, after having been neutralized to a considerable extent with sodium bicarbonate, is introduced into a solution, containing an excess of sodium acetate, of 21.7 parts of 1-amino-2-methoxybenzene-ω-methane sulfonic acid, and the whole is stirred at 10° C. until the coupling is finished. The monoazo-dyestuff is then separated off and hydrolyzed by heating it for 2 hours at 90° C. with a sodium hydroxide solution of 4 percent strength. After cooling the mixture to 40° C., the precipitated amino-monoazo-dyestuff is filtered off, dissolved or suspended in water, 8 parts of sodium nitrite are added, and is further diazotized by pouring in 30 parts of hydrochloric acid of 30 percent strength. The whole is stirred for 2 hours at about 35° C., and the diazo-compound is coupled at 5–10° C., in a solution rendered alkaline with sodium carbonate or sodium bicarbonate with 40 parts of the monoazo-dyestuff obtained by coupling diazotized 1-aminobenzene-3-sulfonic acid under acid conditions with 2-amino-5-hydroxynaphthalene-7-sulfonic acid. The coupling is strongly accelerated by the addition of pyridine or picoline. When the coupling is finished, the trisazo-dyestuff is salted out and filtered off.

The dyestuff paste is dissolved in 2000 parts of warm water with the addition of 30 parts of monoethanolamine, and the solution is mixed with an ammoniacal solution of copper sulfate (corresponding to 50 parts of $CuSO_4.5H_2O$), the whole is heated under reflux, and while stirring, for 10 hours at 90–95° C. The dyestuff so formed of the formula

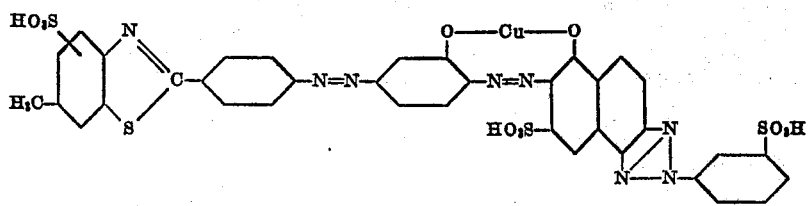

is isolated and dried. There is obtained a grey powder which dissolves in water with a grey-blue coloration and dyes cotton greenish grey tints.

Further cupriferous dyestuffs, which can be obtained in the manner described above, are given in the following table. These dyestuffs are obtained by coupling the diazoazo compounds of the amino-monoazo-dyestuffs obtainable from the initial components of column I and the middle components of column II with the ortho-amino-monoazo-dyestuffs obtained from the diazo-components of column III and 2-amino-5-hydroxy-naphthalene-7-sulfonic acid, and converting the trisazo-dyestuffs in the manner described above into the cupriferous azo-triazole-compounds.

No. 4: 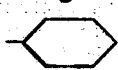

No. 5:

No. 6: 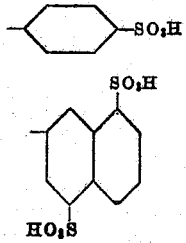

Example 2

The diazo-monoazo-compound obtained as described in the first paragraph of Example 1 is coupled at 5–

| | I | II | III | IV |
|---|---|---|---|---|
| | Initial component | Middle component | Diazo-component ($H_2N-R_3$) used for making the monoazo-dyestuff serving as end component | Tint of the cupriferous dyestuff on cotton |
| 1 | 2-(4'-aminophenyl)-6-methylbenzthiazole-x-sulfonic acid. | 1-amino-2-methoxybenzene | 1-aminobenzene-2-carboxylic acid | Greenish grey. |
| 2 | do | do | 1-aminobenzene-3-carboxylic acid | Grey. |
| 3 | do | do | 1-aminobenzene-4-carboxylic acid | Do. |
| 4 | do | do | Aminobenzene | Do. |
| 5 | do | do | 1-aminobenzene-4-sulfonic acid | Greenish grey. |
| 6 | do | do | 2-aminonaphthalene-4:8-disulfonic acid | Green grey. |
| 7 | 2-(4'-aminophenyl)-6-methylbenzthiazole-x:3'-disulfonic acid. | do | 1-aminobenzene-3-sulfonic acid | Greenish grey. |
| 8 | 2-(4'-aminophenyl)-benzthiazole-x-sulfonic acid. | do | do | Grey. |
| 9 | 2-(4'-aminophenyl)-6-methylbenzthiazole-x-sulfonic acid. | do | 1-amino-4-methylbenzene-3-sulfonic acid | Greenish grey. |
| 10 | do | do | 1-aminobenzene-3-sulfonic acid-amide | Do. |
| 11 | do | 1-amino-2-methoxy-5-methylbenzene | 1-aminobenzene-3-sulfonic acid | Green grey. |
| 12 | 2-(4'-aminophenyl)-6-methylbenzthiazole-x:3'-disulfonic acid. | 1-amino-2-methoxybenzene | Aminobenzene | Grey. |

The dyestuffs Nos. 1–6 of the above table corresponds to the formula

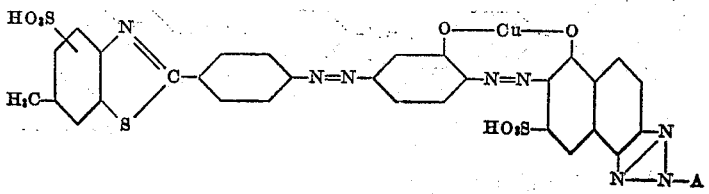

in which A represents respectively the following radicals:

No. 1: 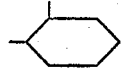

No. 2: 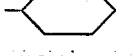

No. 3: 

10° C. in a solution rendered alkaline with sodium carbonate with 42 parts of the triazole compound of the formula

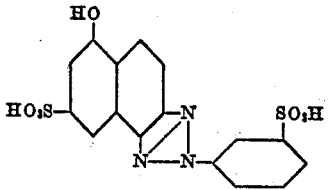

This triazole compound can be made by coupling diazotized 1-aminobenzene-3-sulfonic acid under acid condition with 2-amino-5-hydroxynaphthalene-7-sulfonic acid followed by oxidation with a copper salt.

The dyestuff so obtained, which contains a triazole ring and two azo-linkages, is converted in the manner described in the second paragraph of Example 1 into its complex copper compound, but only one half of the quantity of the agent yielding copper is necessary. The cupriferous dyestuff has the same properties as the dyestuff of Example 1.

*Example 3*

32 parts of 2-(4'-aminophenyl)-6-methyl-benzthiazole-x-sulfonic acid are diazotized, and the diazo-compound is coupled in an acetic acid solution with 25.3 parts of 1-amino-2 - methoxynaphthalene - 6 - sulfonic acid. The monoazo-dyestuff is further diazotized at 30–35° C., and the diazo compound is coupled in a solution rendered alkaline with sodium carbonate in the presence of pyridine with 40 parts of the monoazo-dyestuff obtained by coupling diazotized 1-aminobenzene-3-sulfonic acid under acid conditions with 2-amino-5-hydroxynaphthalene-7-sulfonic acid. The trisazo-dyestuff is isolated and dissolved in 1000 parts of warm water. After the addition of 20 parts of monoethanolamine and an ammoniacal solution of copper sulfate (corresponding to 50 parts of $CuSO_4.5H_2O$), the whole is heated for 8–10 hours at 90–95° C. under a reflux condenser. The resulting dyestuff of the formula

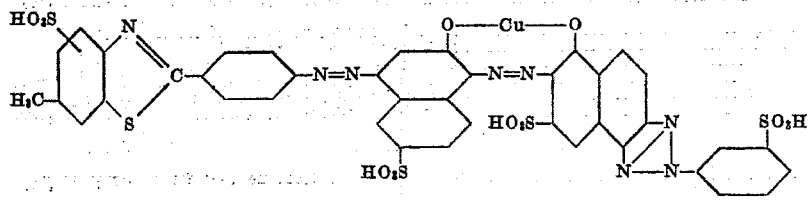

is isolated in the usual manner and dried. It dissolves in water with a green coloration and dyes cotton bluish green tints.

*Example 4*

100 parts of cotton are entered at 40° C. into a dyebath which contains in 3000 parts of water 0.5 part of the cupriferous dyestuff obtainable as described in the second paragraph of Example 1. Dyeing is carried on for one hour while raising the temperature to 90° C., 30 parts of crystalline sodium sulfate are added, and dyeing is continued for a further ½ hour at 90–95° C. The cotton is then rinsed and finished in the usual manner. It is dyed a uniform greenish grey tint.

What is claimed is:

1. A cupriferous azo-dyestuff of the formula

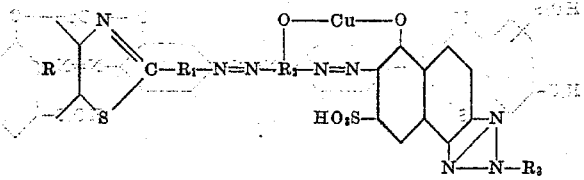

in which R represents a benzene radical fused to the thiazole ring in the manner indicated, $R_1$ represents a benzene radical bound to the azo linkage in para-position to the thiazole ring, $R_2$ represents an aromatic radical containing at the most 10 aromatic nuclear carbon atoms, $R_3$ represents a member selected from the group consisting of a benzene radical and a sulfonated naphthalene radical, and in which at least one of the radicals R and $R_1$ contains a sulfonic acid group and the groups $R_1$—N=N—, —O—Cu— and —N=N are present in the 1:3:4-positions of the radical $R_2$.

2. A cupriferous azo-dyestuff of the formula

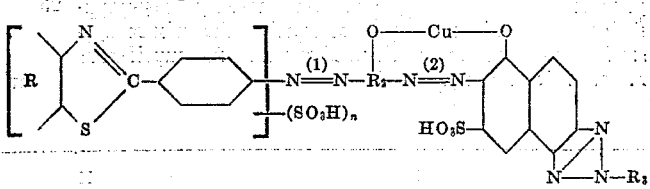

in which R represents a benezene radical fused on to the thiazole ring in the manner indicated, $R_2$ represents a benzene radical, $R_3$ represents a benzene radical, $n$ represents a whole member of at the most 2 and the groups (1) —N=N—, —O—Cu— and (2) —N=N— are present in the 1:3:4-positions of the radical $R_2$.

3. A cupriferous azo-dyestuff of the formula

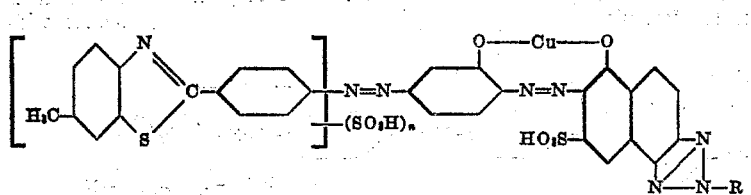

in which $R_3$ represents a benzene radical and $n$ represents a whole number of at the most 2.

4. A cupriferous azo-dyestuff of the formula

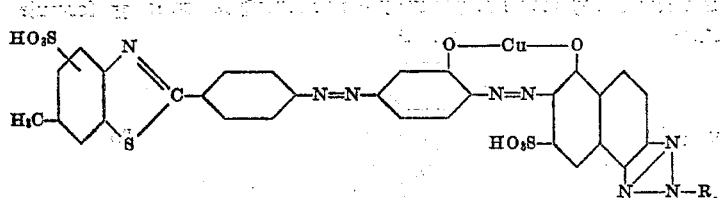

in which $R_3$ represents a benzene radical containing a substituent imparting solubility in water.

5. The cupriferous azo-dyestuff of the formula
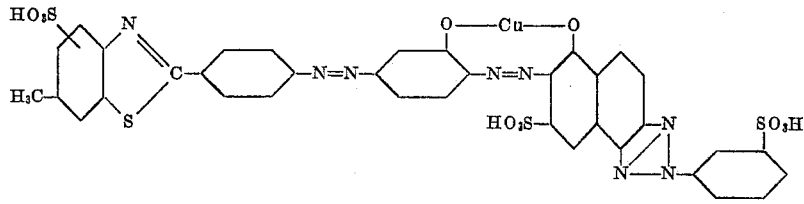
6. The cupriferous azo-dyestuff of the formula
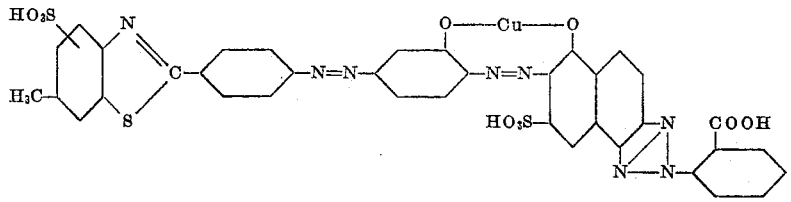
7. The cupriferous azo-dyestuff of the formula
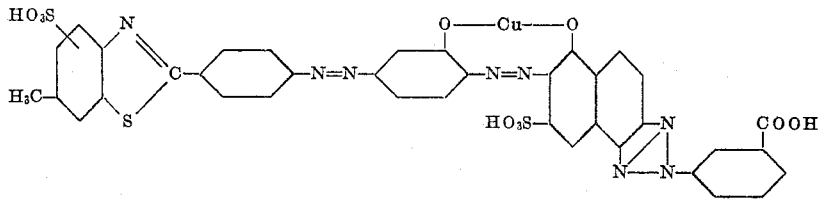
8. The cupriferous azo-dyestuff of the formula
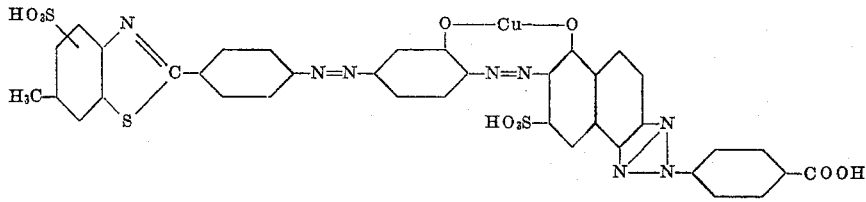
9. The cupriferous azo-dyestuff of the formula
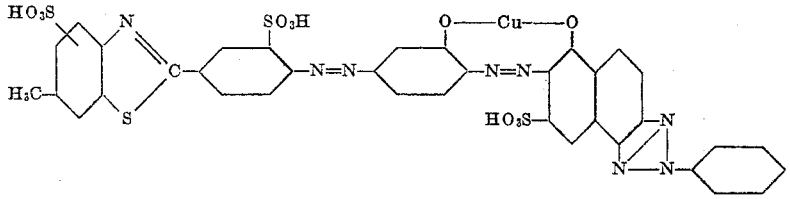
References Cited in the file of this patent
UNITED STATES PATENTS
| | | |
|---|---|---|
| 2,029,591 | Schindhelm et al. | Feb. 4, 1936 |
| 2,390,480 | West | Dec. 4, 1945 |
FOREIGN PATENTS
| | | |
|---|---|---|
| 719,363 | Great Britain | Dec. 1, 1954 |

UNITED STATES PATENT OFFICE

CERTIFICATE OF CORRECTION

Patent No. 2,837,507 June 3, 1958

Henri Riat

It is hereby certified that error appears in the printed specification of the above numbered patent requiring correction and that the said Letters Patent should read as corrected below.

Column 1, line 37, for "napthalene" read -- naphthalene --; column 5, in the first line below the table, for "corresponds" read -- correspond --; column 8, claim 3, the lower right-hand end of the formula, for "R" read -- $R_3$ --.

Signed and sealed this 25th day of November 1958.

(SEAL)
Attest:

KARL H. AXLINE

Attesting Officer

ROBERT C. WATSON
Commissioner of Patents